(12) United States Patent
Martin

(10) Patent No.: US 6,913,175 B2
(45) Date of Patent: Jul. 5, 2005

(54) TRUCK CARRIER

(76) Inventor: Donald Martin, 785 Sundance Circle, Oshawa, Ontario (CA), L1J 8B8

( * ) Notice: Subject to any disclaimer, the term of this patent is extended or adjusted under 35 U.S.C. 154(b) by 3 days.

(21) Appl. No.: 10/267,958

(22) Filed: Oct. 10, 2002

(65) Prior Publication Data
US 2003/0071098 A1 Apr. 17, 2003

(30) Foreign Application Priority Data
Oct. 10, 2001 (CA) ............................................. 2358377

(51) Int. Cl.⁷ .............................. B60P 3/00; B60P 9/00
(52) U.S. Cl. ....................... 224/403; 224/405; 224/551; 296/37.6; 296/100.16; 296/100.18
(58) Field of Search ............................... 224/403, 405, 224/510, 548, 550, 551, 554, 558, 325, 281; 296/3, 36, 37.6, 98, 100.01, 100.16, 100.17, 100.18; 410/150

(56) References Cited

U.S. PATENT DOCUMENTS

| | | | | |
|---|---|---|---|---|
| 4,911,348 A | * | 3/1990 | Rasor et al. | 224/325 |
| 5,139,375 A | * | 8/1992 | Franchuk | 296/100.18 |
| 5,143,415 A | * | 9/1992 | Boudah | 296/3 |
| 5,152,574 A | * | 10/1992 | Tucker | 296/100.18 |
| 5,310,238 A | * | 5/1994 | Wheatley | 296/100.18 |
| 5,393,114 A | * | 2/1995 | Christensen | 296/3 |
| 5,494,327 A | * | 2/1996 | Derecktor | 296/3 |
| 5,584,521 A | * | 12/1996 | Hathaway et al. | 224/405 |
| 5,827,023 A | * | 10/1998 | Stull | 296/3 |
| 6,059,159 A | * | 5/2000 | Fisher | 224/403 |
| 6,431,634 B1 | * | 8/2002 | Ananian | 296/100.12 |
| 6,607,338 B2 | * | 8/2003 | Lemke | 410/151 |
| 6,669,264 B1 | * | 12/2003 | Tucker | 296/100.16 |

* cited by examiner

*Primary Examiner*—Nathan J. Newhouse
(74) *Attorney, Agent, or Firm*—Birch, Stewart, Kolasch & Birch, LLP

(57) ABSTRACT

A load carrier has a pair of rails each being affixed to one of the two side walls of the open bed of a pickup truck. Each rail has a longitudinally extending slot along which a bar slides. A bracket is connected to each bar. The two ends of a stringer are connected to the two brackets so that stringer extends transversely across the open bed for supporting a load. Instead of bars, clamps are used to connect the brackets to the rails.

5 Claims, 5 Drawing Sheets

TRUCK CARRIER

BACKGROUND OF THE INVENTION

This invention relates to carriers for pickup trucks and more particularly to a carrier which is removably attached to the side walls of the open bed of a pickup truck and which supports loads above the open bed.

The carrying capacity of a pickup truck is limited not only by the size of its open bed but by the height of the side walls and tail gate which define the bed. For example, if a pickup truck is used to carry particulate material, such as sand and gravel, the height of the side walls and tail gate will govern the quantity of particulate material that the truck will carry.

I have invented a load carrier for a truck which is attached to the upper edge of the side walls of a pickup truck and which support loads above the open box. It does not matter whether the side walls and tail gate are high or low. Thus, the capacity of the truck is no longer limited by the height of its side walls and tail gate.

My load carrier can be used in conjunction with a conventional tonneau cover for a pickup truck. Such covers are usually attached by snap fasteners to rails located on the upper horizontal margins of the side walls of the truck. According to one embodiment, a bar is received in a slot in each rail and slides along the length of the rail. The bar can be positioned where it is most convenient and bolted or screwed in place to prevent it from moving. A bracket is attached to each bar and to the bracket is attached a stringer which supports a load.

According to another embodiment of the load carrier, a clamp is provided for connecting a bracket to each rail and side wall of the truck. Like the first embodiment, the bracket connects the stringer to the truck. The clamp can be connected anywhere along the length of the side wall so that the position of the stringer can be adjusted to where it is most convenient.

Loads such as skis, bicycles, sheets of plywood, lengths of lumber and so on can be tied to the stringer so that they are above the upper margins of the side walls and tonneau cover if there is one.

SUMMARY OF THE INVENTION

Briefly, the load carrier of my invention includes a pair of rails which are affixed to the upper margin of each side wall of a pickup truck. Each rail has a longitudinally extending slot along which a bar slides. A bracket is connected to each bar and a stringer is connected to the brackets in the two rails. The stringer extends transversely across the open bed for supporting a load.

The second embodiment of the load carrier has a pair of rails each adapted to rest on the upper margin of each side wall of the truck. A clamp connects a bracket to each rail and each side wall of the truck. A stringer is connected to the brackets and extends transversely across the open bed.

DESCRIPTION OF THE DRAWINGS

The load carrier of the invention is described with reference to the accompanying drawings in which.

Like reference characters refer to like parts throughout the description of the drawings.

DESCRIPTION OF THE PREFERRED EMBODIMENT

Figure 1:
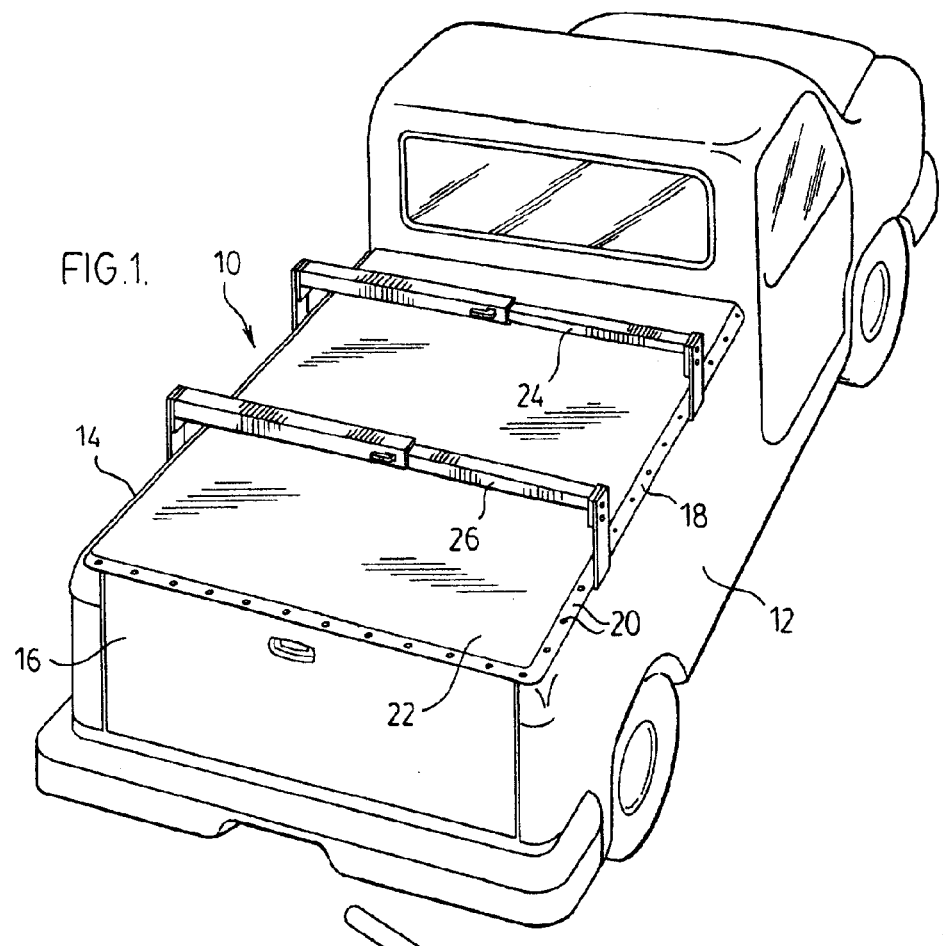
FIG. 1 is a perspective view of a pair of load carriers in conjunction with the open bed of a pickup truck and a tonneau cover for the bed.

With reference to FIG. 1 an open bed, generally 10, of a pickup truck has a pair of side walls 12, 14 and a tail gate 16. A rail 18 extends along the upper horizontal margin of side wall 12 and a like rail (not illustrated) extends along the length of the upper margin the other side wall 14. A number of grommets 20 are spaced along the length of the rail for receipt of dome fasteners attached to tonneau cover 22. Two spaced load carriers 24, 26 are connected to the rails and extend across the open bed 10.

Figure 4:
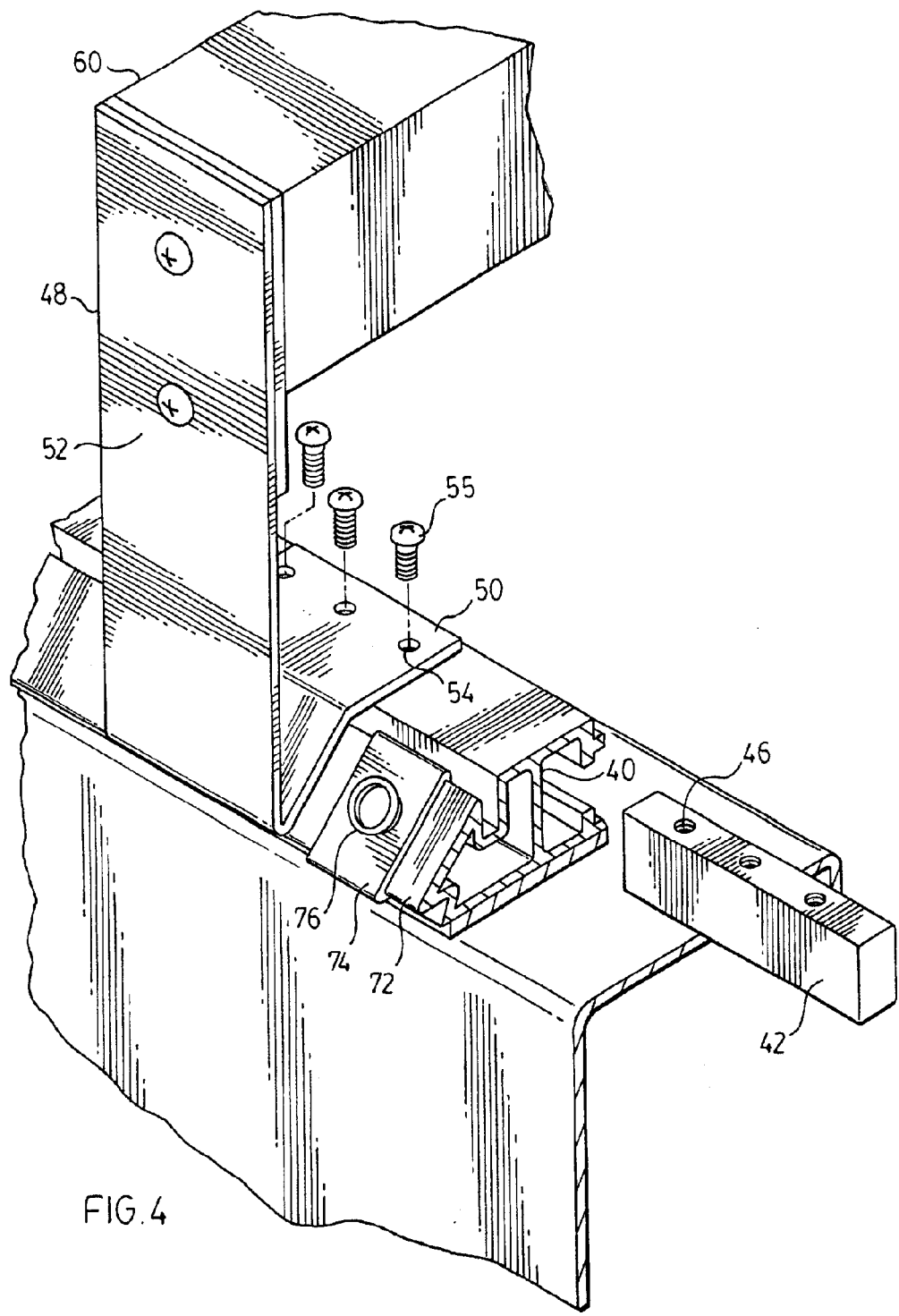
FIG. 4 is an enlarged perspective view of the components of the load carrier together with a portion of the side wall of the truck.
Figure 5:
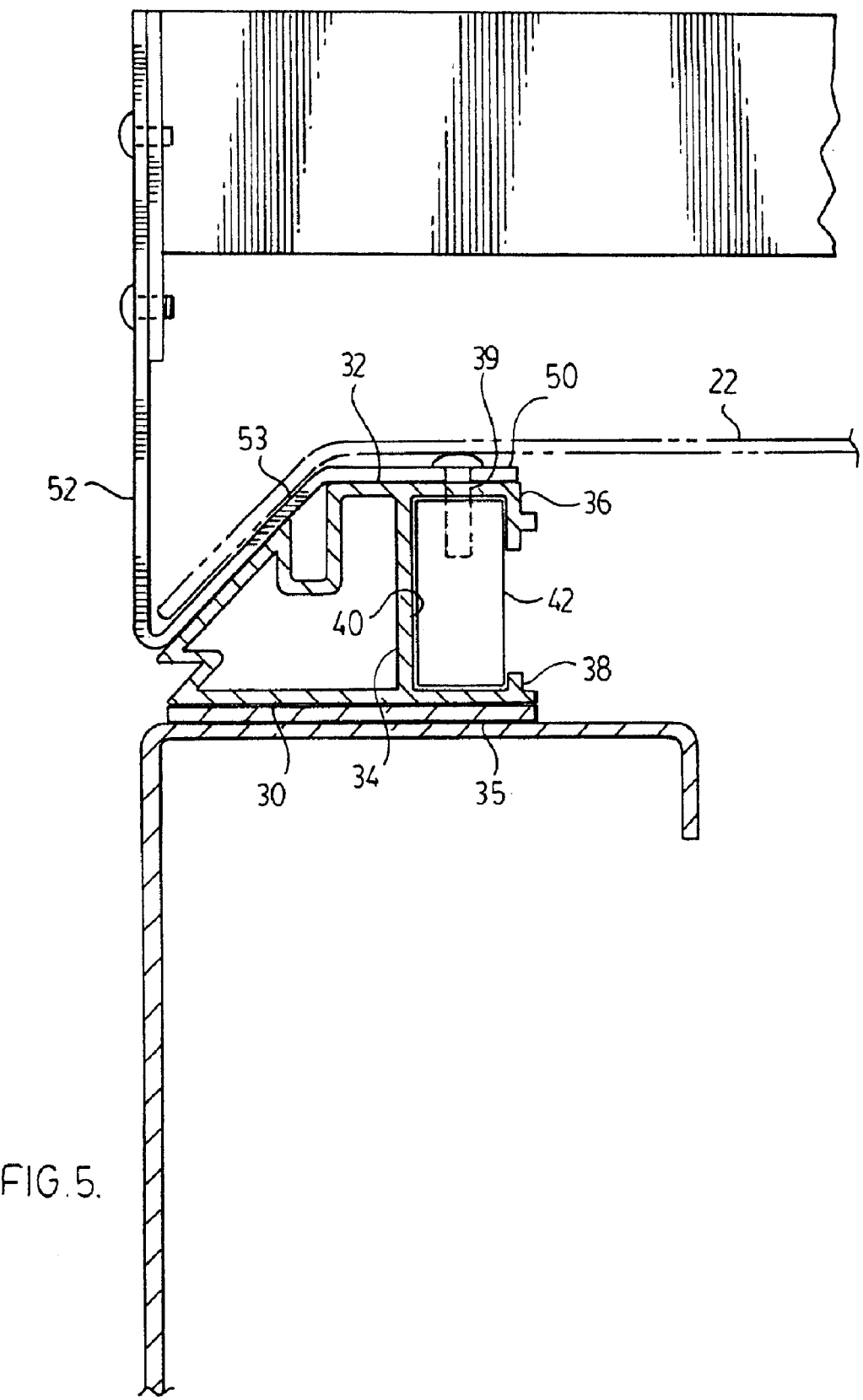
FIG. 5 is an elevation of the components illustrated in FIG. 4.

With reference to FIGS. 4 and 5, rail 18 has lower and upper flanges 30, 32 and a vertical web 34 which interconnects the two flanges. The rail is seated on pad 35. An upper lip 36 extends downward from an edge of the upper flange 32 and a lower lip 38 extends upwardly from the edge of the lower flange. A number of apertures are spaced along the length of the upper flange. One of those apertures is identified as 39 in FIG. 5.

The lips, web and the portion of the upper and lower flanges which extend therebetween define a slot 40 which extends the length of the rail. A bar 42, rectangular in section, is received in the slot and is free to slide therein. Lips 36, 38 confine the bar in the slot. Apertures 46 are formed in the upper wall of the bar. The latter apertures open into threaded bores which extend downwardly into the bar.

A bracket 48 has a horizontal wall 50, a vertical wall 52 and an intermediate wall 53 which extends therebetween. Apertures 54 are formed in the horizontal wall. The spacing between the apertures 54 is the same as that between apertures 39 in the upper flange and between the apertures 46 in the bar. The bracket can be connected to the upper flange and to the bar by means of connecting means such as screws 55 which pass through the apertures in the horizontal wall of the bracket, through the apertures in the upper flange and into the threaded bores in the bar. Each screw will accordingly pass through apertures which register or correspond with one another. The apertures which are in register or correspond in position with one another are those which offer a passageway for a screw.

The bracket can be positioned where it is most convenient. Once in that position, the bar can be moved until it is beneath the bracket and its apertures are in register with those in the bracket and upper flange. Screws can then be passed through those apertures to connect the bracket to the rail.

A stringer 60 has an end which is connected to the vertical wall 52 of the bracket by means of screws which pass through apertures in the wall and into threaded bores in the stringer.

Figure 2:
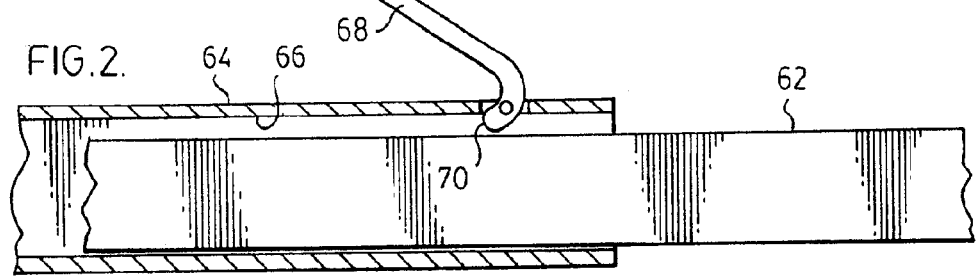
FIGS. 2 and 3 are partial sections of a stringer to which a load is connected.
Figure 3:
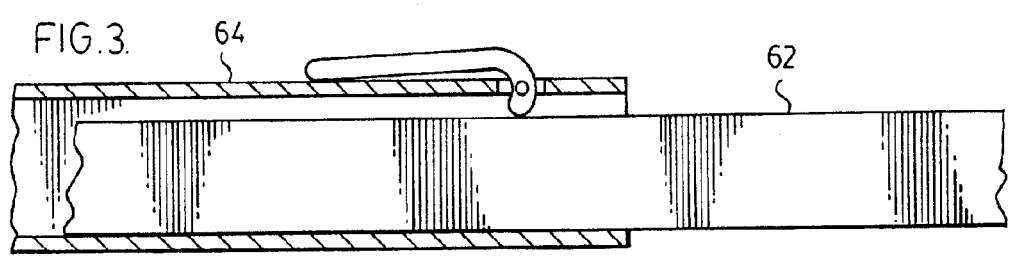

The length of stringer 60 is adjustable. With reference to FIGS. 2 and 3, the stringer is made up of a rod 62 of square cross-section and a sleeve 64 having an elongated opening 66 of the same cross-section as the rod but slightly larger so that the rod may slide freely in the opening. A handle 68 is pivotally attached to the sleeve and has an inner end 70 which moves into and out of contact with the rod as the handle pivots. When the inner end is out of contact with the rod as illustrated in FIG. 2, the rod may freely slide in the sleeve so that the length of the stringer can be adjusted. When the inner end contacts the rod, as illustrated in FIG. 3, the bar is fixed in position and the length of the stringer is no longer adjustable.

With reference again to FIGS. 4 and 5, on the side of the rail opposite the slot, a track 72 is formed. A slider 74 is free to slide along the track. A socket 76 of a snap fastener is connected to the slider. The head or rounded portion of the fastener is attached to the outer edge of tonneau cover 22 for removable attachment of the cover to the rail.

As illustrated in FIG. 1, two or more stringers can be attached to the truck. Each end of the stringer is attached to a rail by a bracket. A load can be connected to the stringers by ropes, spring clips and the like. Once connected, the load will be above the open bed and will occupy no space in it.

Figure 6:
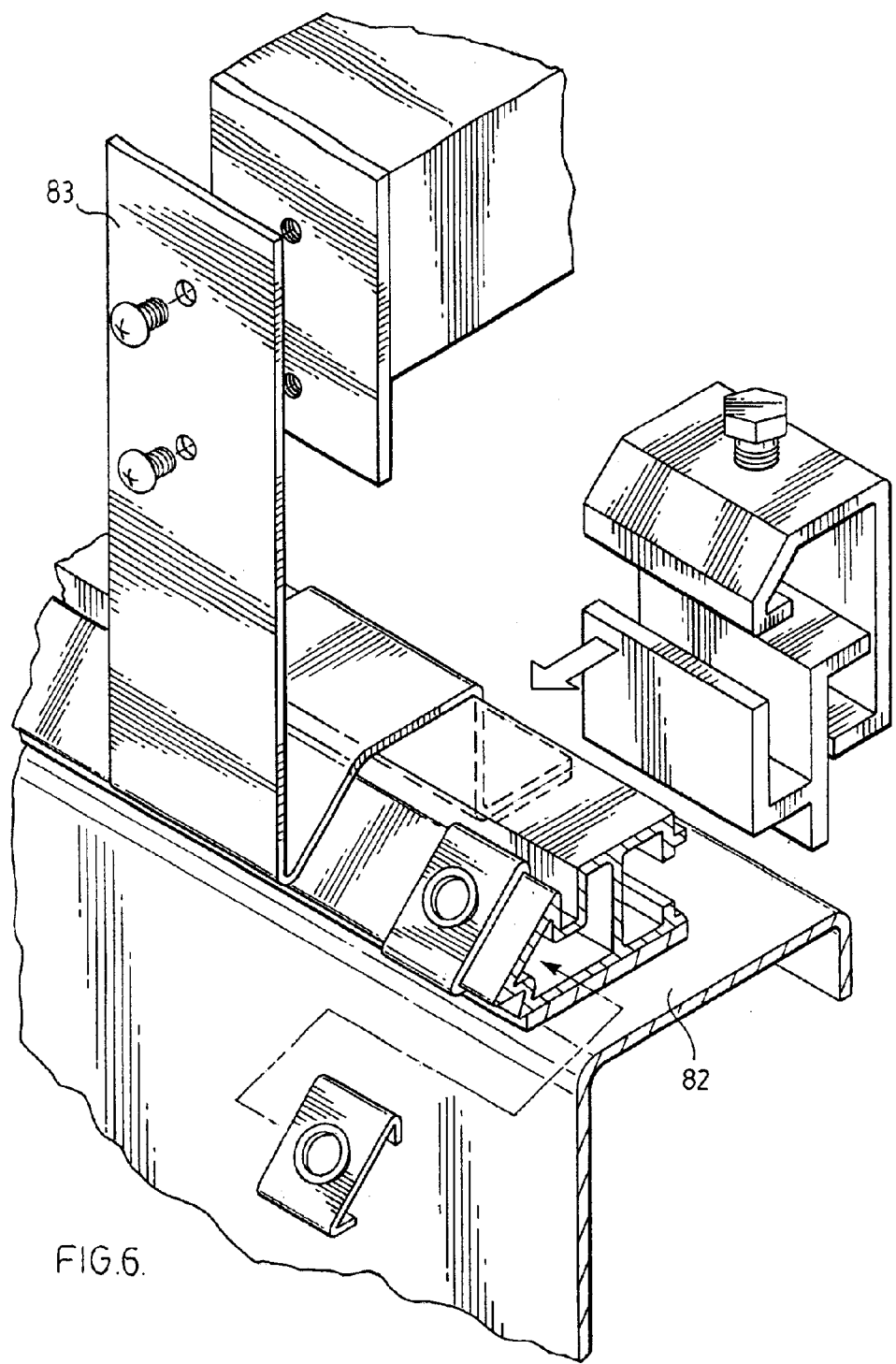
FIG. 6 is an perspective view of the components of a second embodiment of the load carrier.
Figure 7:
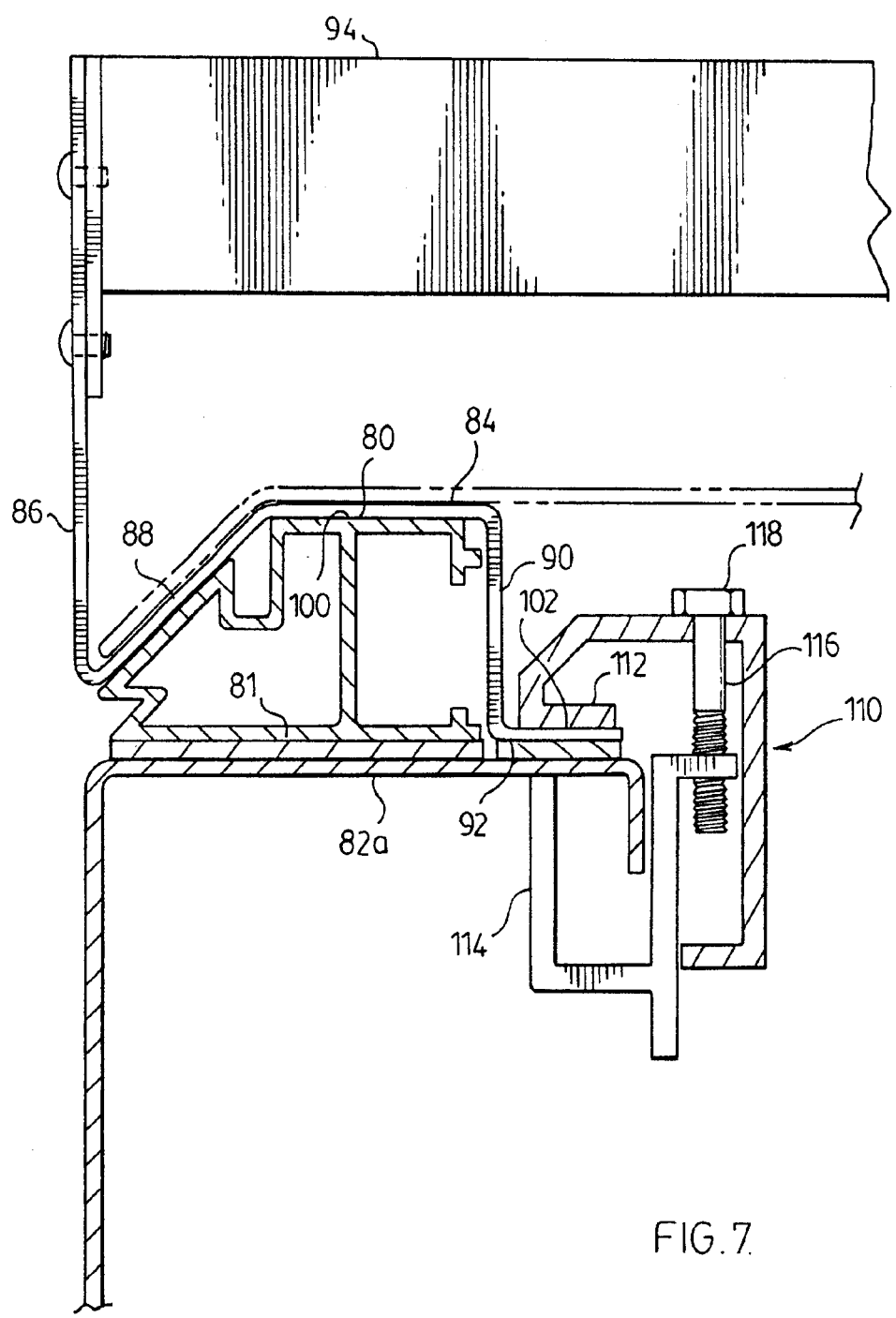
FIG. 7 is an elevation of the carrier illustrated in FIG. 6.

With reference to FIGS. 6 and 7, rail 80 has the same construction as rail 18 and rests on pad 81 which in turn rests on the upper horizontal margin 82 of the side wall of the track. The rail is attached the side walls of a pickup truck in the manner illustrated in FIG. 1. Bracket 83 has a first horizontal wall 84 and a first vertical wall 86. An intermediate wall 88, offset from the angle of the two walls 84, 86 extends downwardly from the rear edge of wall 84 and terminates at the lower edge of wall 86. A second vertical wall 90 extends downwardly from the front edge of wall 84 and terminates at a second horizontal wall 92.

A stringer 94 is attached by screws or other means to the first vertical wall 86. Holes are provided in the stringer and like holes are provided in the vertical wall for this purpose. The stringer serves the same function as stringer 60 of the previous Figures.

Wall 84 of the bracket rests on the upper flange 100 of rail 80. Wall 92 is seated on a pad 102 which rests on margin 82 of the side wall of the truck. Wall 84 is not attached to the rail nor is wall 92 attached to the side wall of the truck.

A clamp, generally 110, has jaws 112, 114 which contact wall 92 and the underside 82a of the margin of the side wall of the truck. The jaws are interconnected by means of a threaded stud 116 having a head 118 which when rotated in one direction causes the jaws to separate from one another and when rotated in the opposite direction causes the jaws to approach each other. The clamp is of conventional construction.

In operation, the bracket is clamped to the rail and side wall of the truck in the manner illustrated in FIG. 7. No screws, bolts or other connectors are needed for this purpose apart from the clamp. The position of the bracket can be positioned where the stringers will be most conveniently located. Its position can be anywhere along the length of the side walls.

The load carrier of FIGS. 6 and 7 is simple of construction. It is made up of components which in most cases are of conventional construction and widely available. For example, the clamps which are used to attach the carrier to the truck may be of a variety of different constructions. There is no requirement for clamps to be of a particular shape or size.

It will be understood of course that modifications can be made in the load carrier illustrated and described herein without departing from the scope and purview of my invention as defined in the following claims.

I claim:

1. A load carrier for a pickup truck having an open bed defined by a tail gate and a pair of spaced walls which extend from said tail gate to a cab, each said side wall having an upper margin having oppositely facing upper and lower surface, said pickup truck having a tonneau cover for said open bed, said tonneau cover having an outer edge, said load carrier comprising:

a pair of rails each adapted to rest on the upper margin of a separate said side wall, a pair of brackets each having a lower wall and a horizontal wall disposed above each said rail; a pair of clamps each having jaws adapted to engage said lower wall and said lower surface for connecting said brackets to said upper margins and when so engaged each said horizontal wall bears downwardly on each said rail and thereby prevents said rail from moving relative to said side walls; a stringer which is connected to said brackets and which is adapted to extend transversely across said open bed; a track which extends the length of said rail; and a slider movable along said track, said slider having means for connection to said tonneau cover such that said outer edge is spaced inwardly of said brackets.

2. The load carrier as claimed in claim 1 wherein said stringer includes a sleeve; a rod slidingly received in said sleeve; and a handle pivotally connected to said sleeve and having an end which moves into and out of contact with said rod as said handle pivots such that said rod is selectively immovable and movable relative to said sleeve as said handle pivots.

3. The load carrier as claimed in claim 1 wherein said rail has upper and lower flanges and a web which extends therebetween, said slot being defined by said flanges and said web, said bracket having a wall which rests on said upper flange.

4. The load carrier as claimed in claim 1 wherein the length of said stringer is adjustable.

5. The load carrier as claimed in claim 4 wherein said stringer includes a sleeve; a rod slidingly received in said sleeve; and a handle pivotally connected to said sleeve and having an end which moves into and out of contact with said rod as said handle pivots such that said rod is selectively immovable and movable relative to said sleeve as said handle pivots.

* * * * *